United States Patent
Kang et al.

(10) Patent No.: US 7,457,618 B2
(45) Date of Patent: Nov. 25, 2008

(54) METHOD FOR CONTROLLING DATA OF BASE STATION

(75) Inventors: Myong-Soo Kang, Gwangmyeong-si (KR); Seung-Han Kim, Seoul (KR); Yurle Sung, Suwon-si (KR); Won-Cheol Han, Goyang-si (KR); Geon-Jung Kim, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 352 days.

(21) Appl. No.: 10/496,988

(22) PCT Filed: Nov. 29, 2002

(86) PCT No.: PCT/KR02/02242

§ 371 (c)(1),
(2), (4) Date: May 27, 2004

(87) PCT Pub. No.: WO03/047287

PCT Pub. Date: Jun. 5, 2003

(65) Prior Publication Data

US 2005/0014492 A1  Jan. 20, 2005

(30) Foreign Application Priority Data

Nov. 29, 2001  (KR) .................. 10-2001-0075053
Jun. 5, 2002  (KR) .................. 10-2002-0031497

(51) Int. Cl.
H04Q 7/20  (2006.01)
(52) U.S. Cl. .................. 455/422.1; 455/419; 455/420; 455/452.2; 455/456.1; 455/456.2
(58) Field of Classification Search .................. 455/418, 455/419, 452.2, 456.1, 456.2, 556.1, 556.2, 455/420, 433, 456.5, 456.6, 422.1, 560
See application file for complete search history.

(56) References Cited

U.S. PATENT DOCUMENTS 6,366,791 B1 *  4/2002  Lin et al. ................. 455/567
6,760,324 B1 *  7/2004  Scott et al. ............... 370/352
2002/0019227 A1 *  2/2002  Hurme et al. ............. 455/433

(Continued)

FOREIGN PATENT DOCUMENTS

JP  09-093643 A  4/1997

(Continued)

OTHER PUBLICATIONS

PCT International Search Report for PCT Application No. PCT/KR02/02242, mailed Dec. 26, 2002.

*Primary Examiner*—Tuan A Pham
(74) *Attorney, Agent, or Firm*—RatnerPrestia

(57) ABSTRACT

A method for controlling data of base stations is disclosed. A base station management server generates and stores base station management data and mobile switching center access data. The base station management server receives requests of base station management data by a mobile terminal through a communication network. The base station management server transmits the base station management data to the mobile terminal in response to the request. It is more convenient when managers or operators manage and operate the base station management server because they do not need to physically move to view and/or modify the data of the base station.

19 Claims, 16 Drawing Sheets

U.S. PATENT DOCUMENTS

| | | | |
|---|---|---|---|
| 2002/0037710 A1* | 3/2002 | Park | 455/414 |
| 2003/0003906 A1* | 1/2003 | Demers et al. | 455/424 |
| 2003/0050070 A1* | 3/2003 | Mashinsky et al. | 455/452 |
| 2003/0161296 A1* | 8/2003 | Butler et al. | 370/352 |
| 2005/0190789 A1* | 9/2005 | Salkini et al. | 370/466 |

FOREIGN PATENT DOCUMENTS

| | | |
|---|---|---|
| JP | 11-146459 A | 5/1999 |
| JP | 2001-119492 | 4/2001 |
| KR | 1999-0070423 A | 9/1999 |

\* cited by examiner

FIG.10

[ACCESSIBLE MSC LIST]

1. M1
2. M2

[SEL]  [NEXT]

FIG.11

[BSC LIST]

1. BSC 0
2. BSC 1
3. BSC 2
√ 4. BSC 3
▼

[SEL]  [NEXT]

FIG.12

[BSC 3 : BST LIST]

√ 1. M1 05  NAMSAN
2. M2 06  YULJIRO
3. M3 07  JONGRO
▼

[SEL]  [NEXT]

FIG.13

```
          [BS LIST]

1. KANGBUK M1 70   NAMGAJA
V 2. KANGBUK M1 05   NAMSAN
  3. KANGBUK M2 06   NAMDAEMOON
  ▼

[SEL]                    [NEXT]
```

FIG.14

```
         <M1 05 NAMSAN>
  1. CALL QUALITY
  2. ALARM
  3. BLOCK/UNBLOCK
  4. PARAMETER
  5. REPEATER DATA

[SEL]                    [NEXT]
```

FIG.15

```
      <NAMSAN_(WHOLE QULITY)>

1. STATISTIC REGARDING 10 MINS
V 2. STATISTIC FOR 1 HOUR
  3. TODAY'S STATISTIC
  4. YESTERDAY'S STATISTIC

[SEL]                  [BEFORE]
```

FIG.16

```
<NAMSAN_CALL QUALITY>
  11/30 19:00~20:00
        <TOTAL>                    ———161
TRAFFIC   CUT    TRY
 97.48   0.79   1822
        <SECTOR>                   ———163
SEC  TRAFFIC  CUT   TRY
 A    97.48  0.79  1822
 B    97.81  0.50   411
 C    97.01  1.10   469
         <FA>                      ———165
SEC FA  TRAFFIC CUT  TRY
 A   0   96.96 1.39  296
 A   0   97.03 0.38  269

[SEL]                  [BEFORE]
```

FIG.17

```
      <NAMSAN ALARM>
CRITICAL:xxxxxxx
MAJOR:xxxxxxx
MINOR:xxxxxxx

[SEL]                  [BEFORE]
```

FIG.18

```
    <NAMSAN>
 1. BLK-CC
 2. UNBLK-CC
 3. BLK-CIP
 4. UNBLK-CIP
 5. BLK-FA
 6. UNBLK-FA

[SEL]
```

FIG.19

```
   <NAMSAN BLK-CC>

1. CIP#    : 2
 2. CARD No.# : 2

[OK]          [BEFORE]
```

FIG.20

```
  <NAMSAN BLK-CIP>

CIP#  (0 — 12) :
       2

[OK]          [BEFORE]
```

FIG.21

```
<NAMSAN  BLK_FA>
FA# :  1

[OK]          [BEFORE]
```

FIG.22

```
<NAMSAN_BS OUTPUT>
FEB./1    13:00

α 50 40 30 25
   β 30 23 33 22
   γ 66 67 68 66

[OK]          [BEFORE]
```

FIG.23

<BSM STATISTICS>

```
SE2M2BSM 2002-01-29 12:01:32 TUE
M6102 STATISTICS ON CALL TRAFFIC - HOURLY REPORT
   ITEM = TRAF_ORG
   DATE = 2002-01-29 11:00 ~ 12:00
   BSC_ID = 00
```

| BCP | SEC | FA | ATTEMPT | AT_EVRC | ATT_SMS | ATT_DAT | SEIZURE | CAL_PRC | ALERT | ANSWER |
|---|---|---|---|---|---|---|---|---|---|---|
| | | | AN_EVRC | ANS_SMS | ANS_DAT | NO_ANSW | TC_UNAV | CEL_OOS | TC_FULL | OVR_PWR |
| | | | CEL_REL | NO_FRAM | BAD_FRA | NOT_ACQ | SYNC_TO | SO_REJT | UNA_RSC | VOC_BSY |
| | | | TRK_ABN | TCE_BCP | CCP_BCP | MS_SVP | CCP_SVP | CCP_MSC | OVD_STS | BSC_ETC |
| | | | AUC_FAL | UNA-USR | UNA_NUM | USR_BSY | NO_RESP | MS_POFF | RSC_CON | TRK_BSY |
| | | | TRK_CNG | TRK_FLT | LR_TOUT | AP_TOUT | DB_FAIL | SIG_ERR | MSC_FLT | MSC_ETC |
| | | | ORG_REL | TER_REL | MOB_REL | MSC_REL | DRP_BDF | DRP_NOF | DRP_ETC | A_SZR_% |
| | | | A_CPL_% | A_TRF_e | A_HLD_s | A_DLYms | | | | |
| 0 | 0 | 0 | 0 | 102 | 15 | 0 | 113 | 113 | 94 | 0 |
| | | | 71 | 15 | 0 | 0 | 0 | 0 | 0 | 0 |
| | | | 1 | 0 | 0 | 1 | 0 | 0 | 0 | 0 |
| | | | 0 | 0 | 0 | 0 | 0 | 0 | 0 | 0 |
| | | | 0 | 0 | 1 | 4 | 0 | 0 | 0 | 0 |
| | | | 0 | 0 | 0 | 0 | 0 | 0 | 0 | 0 |
| | | | 0 | 0 | 0 | 0 | 0 | 0 | 0 | 0 |

FIG.24

| FIELD | 1 | 2 | 3 | 4 | 5 | 6 | 7 |
|---|---|---|---|---|---|---|---|
| CALL DATE/TIME | | | | | CALL NO. | RECEIVE NO. | |
| 2002-02-03 00:00:00.01 | 2 | 1542029 | 1 | 6 | 17******* | 17******* | 247 |
| 2002-02-03 00:00:00.01 | 2 | 1542030 | 0 | 6 | 17******* | 11******* | 101 |
| 2002-02-03 00:00:00.01 | 2 | 1542031 | 0 | 6 | 17******* | 17******* | 247 |
| 2002-02-03 00:00:00.01 | 2 | 1542032 | 0 | 6 | 17******* | 22******* | 201 |
| 2002-02-03 00:00:00.01 | 2 | 1542033 | 0 | 6 | 17******* | 119******* | 233 |
| 2002-02-03 00:00:00.01 | 2 | 1542034 | 1 | 6 | 17******* | 17******* | 117 |
| 2002-02-03 00:00:00.01 | 2 | 1542035 | 0 | 6 | 17******* | 17******* | 117 |
| 2002-02-03 00:00:00.01 | 2 | 1542036 | 0 | 6 | 17******* | 19**** | 160 |
| 2002-02-03 00:00:00.02 | 2 | 1542037 | 1 | 6 | 17******* | 17******* | 233 |

2400

| 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|
| | | ROUTE | START TIME | | | | MSC# | BSC | BTS | SECTOR | FA | | | |
| 3 | 3 | | 59:36.1 | 0 | 3 | 0 | 2 | 7 | 2 | 0 | 3 | 2 | 3 | 2 |
| 0 | 0 | 220 | 59:41.0 | 0 | 5 | 0 | 2 | 10 | 2 | 1 | 0 | 2 | 0 | 2 |
| 1 | 1 | | 59:36.1 | 0 | 4 | 0 | 2 | 7 | 9 | 2 | 1 | 2 | 1 | 9 |
| 3 | 3 | 200 | 59:41.0 | 0 | 1 | 0 | 2 | 11 | 13 | 0 | 3 | 2 | 3 | 13 |
| 1 | 1 | 212 | 59:43.0 | 0 | 0 | 0 | 2 | 5 | 5 | 2 | 1 | 2 | 1 | 5 |
| 0 | 0 | 836 | 59:22.0 | 0 | 2 | 0 | 2 | 1 | 14 | 0 | 0 | 2 | 0 | 14 |
| 3 | 3 | | 59:58.0 | 0 | 1 | 0 | 2 | 6 | 11 | 2 | 3 | 2 | 3 | 11 |
| | | | 59:58.0 | 0 | 0 | 0 | 2 | | | | | 2 | | |
| 3 | 3 | | 59:03.0 | 0 | 2 | 0 | 2 | 8 | 8 | 1 | 3 | 2 | 3 | 8 |

| 24 | 25 | 26 | 27 | 28 | 29 | 30 | 31 | 32 | 33 | 34 | 35 | 36 |
|---|---|---|---|---|---|---|---|---|---|---|---|---|
| | | SVC_TYPE | CFC | | | CALL_TYPE | DIRECTION | | | | | |
| 1 | 3 | 3 | 0 | 3 | 3 | 1 | 1 | 3 | 3 | 255 | 255 | 0 |
| 1 | 0 | 0 | 0 | 0 | 0 | 2 | 2 | 0 | 0 | 255 | 255 | 0 |
| 2 | 1 | 1 | 0 | 1 | 1 | 1 | 1 | 1 | 1 | 255 | 255 | 0 |
| 0 | 3 | 3 | 4 | 3 | 3 | 2 | 2 | 3 | 3 | 0 | 116 | 0 |
| 2 | 1 | 1 | 0 | 1 | 1 | 2 | 2 | 1 | 1 | 255 | 255 | 0 |
| 0 | 0 | 0 | 0 | 0 | 0 | 1 | 1 | 0 | 0 | 255 | 255 | 0 |
| 2 | 3 | 3 | 3 | 3 | 3 | 1 | 1 | 3 | 3 | 0 | 115 | 0 |
| | | | 3 | | | 1 | 1 | | | 0 | 115 | 0 |
| 1 | 3 | 3 | 28 | 3 | 3 | 1 | 1 | 3 | 3 | 0 | 41 | 0 |

FIG.25

| NAME | MIN | RANK | MSC |
|---|---|---|---|
| KIM, KAB-DONG | 011-888-**** | 1 | M1,M2 |
| KIM, DONG-YOUL | 011-888-0*** | 2 | M1,M2 |
| JUNG, BYENG-SOO | 011-888-00** | 1 | M1,M3 |
| CHOI, JUNG-RUK | 011-888-000* | 2 | M3 |

※ 1st RANK : MONITER & MODIFY
　 2nd RANK : ONLY MONITER

METHOD FOR CONTROLLING DATA OF BASE STATION

This application is a U.S. National Phase Application of PCT International Application PCT/KR02/02242.

FIELD OF THE INVENTION

This invention relates to a method for controlling data of base stations, more particularly, the method for controlling data of at least one base station by a mobile terminal via a mobile communication system.

BACKGROUND OF THE INVENTION

Conventionally, to manage call quality of a base station which is changed to various conditions at any times, a plurality of data based on each base station are analyzed. Predetermined items of the call quality are compiled as statistics based on the analyzed data. And a manager or an operator should monitor the statistics values at all times of the base station. Furthermore, the data analyzed, statistic, and monitor proceed only in the management server of the base station.

Thus, the manager or the operator need to move to the place where the base station is located to monitor the data that are complied as statistic and are analyzed. Therefore, it is very inconvenient to manage the base station.

SUMMARY OF THE INVENTION

The present invention is provided to control the base station data by a mobile terminal, such as a call quality, an alarm, a block/unblock, a parameter, and data of a repeater.

In accordance with the invention, a method for controlling data of a base station comprises the steps of: (a) generating and storing a base station management (BSM) data and an MSC access data at a management server; (b) receiving a demand to transmit the predetermined BSM data from a mobile terminal which accesses the management server through a communication network; and (c) transmitting the predetermined BSM data in response to the demand to the mobile terminal. The BSM data is generated based on BSM statistic data or detailed call records. The MSC access data grants an MSC access authority to the mobile terminal, and restricts access of the mobile terminal to an MSC.

Preferably, the step (b) comprises (b-1) transmitting a wireless Internet service menu to the mobile terminal; (b-2) transmitting a wireless management system menu to the mobile terminal in response of a request of the wireless management system menu when the request is generated from the mobile terminal, wherein the wireless management system menu is included in the wireless Internet service menu, and the wireless management system menu includes a "zero call" and a "base station based finding"; (b-3) transmitting a BS list including at least one base station to the mobile terminal when the "base station based finding" is selected, the BS list corresponding to the "base station based finding"; (b-4) searching the MSC access data for an MSC access grade of the mobile terminal and transmitting a BSM menu corresponding to the MSC access grade, when one of the BS list is selected by the mobile terminal; and (b-5) receiving one of the BSM menu corresponding to the selection of the mobile terminal; and wherein the step (c) comprises the step of searching the BSM data in response to one of the BSM menu and providing the BSM data to the mobile terminal.

Thus, this invention is provided to prevent the unnecessary movement to the base station for monitoring and modifying the data of the base station, so as to enhance efficiency and convenience.

BRIEF DESCRIPTION OF THE DRAWINGS

FIG. 7 through FIG. 22 are display parts of a mobile terminal for illustrating the flow diagram of FIG. 2 through FIG. 6;

FIG. 23 is an example of a base station management statistic data in accordance with one embodiment of the present invention;

FIG. 24 is an example of a Call Detail Record in accordance with one embodiment of the present invention;

FIG. 25 is an example of a MSC access data in accordance with one embodiment of the present invention.

DETAILED DESCRIPTION OF THE PREFERRED EMBODIMENT

Illustrative embodiments of the invention are described below.

Figure 1:
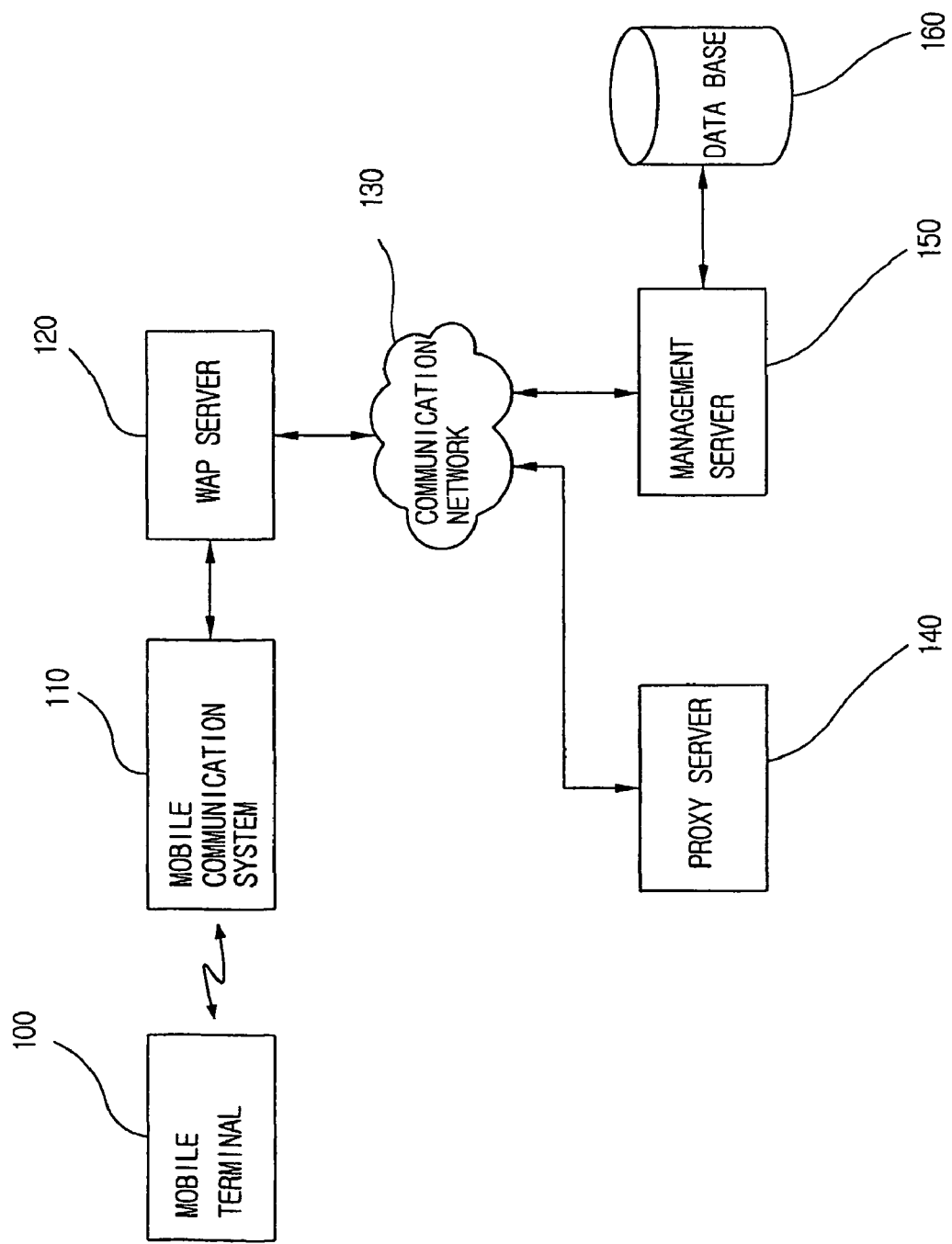
FIG. 1 is a simplified block diagram of a system for controlling data of a base station applied to the present invention.

FIG. 1 is a simplified block diagram of a system for controlling data of a base station applied to the present invention.

Referring now to FIG. 1, a simplified block diagram of a base station data control system comprises a mobile terminal 100, a mobile communication system 110, a WAP server 120, a communication network 130, a proxy server 140, a management server 150, and a database 160 coupled to the management server 150.

The mobile communication system 110 includes a base station (BS), a mobile switching center (MSC), a home location register (HLR), and a short message service center (SMSC). The base station comprises a base transceiver system (BTS) and a base station controller (BSC).

The mobile terminal 100 takes on a variety of forms, such as a PDA or a notebook computer, or the like. The mobile terminal 100 accesses to the WAP server 120 through the mobile communication system 110 that is connected to the WAP Server 120. The mobile terminal 100 is also adapted to communicate with a WAP server 120 using a wide area protocol, such as a cellular protocol through the mobile communication system 110.

The WAP (Wireless Application Protocol) server 120 is also connected to the mobile communication system 110 and the communication network 130. The WAP server 120 of the present invention provides a gateway between two networks, where at least one of the network is a wireless network. The gateway function of the WAP server 120 makes the necessary translations in analog or digital packets being sent from one network to the other network.

The communication network 130 is connected to the proxy server 140 and the management server 150 as well.

The proxy server 140 intercedes in the message pathway and in the route message to the mobile terminal 100. The proxy server 140 communicates with the mobile terminal 100 through the communication network 130. The proxy server 140 and the management server 150 may be physically and separately located, and both are coupled to the communication network 130 as illustrated. Alternatively, the proxy server 140 and the management server 150 may be implemented in a single computer, and both are directly coupled.

The management server 150 creates a base station management (hereafter abbreviated as BSM) data of the base station and an MSC access data, and stores the BSM data and the MSC access data in the database 160 coupled to the management server 150.

The management server 150 also generates a plurality of interactive web page (hereinafter web page) based on the BSM data and the MSC access data. In another application example, the generated page is a WAP page, although not limiting to the present invention.

The web pages are a means for communicating between the mobile terminal 100 and the management server 150. The web pages are transmitted from the management server 150 to the mobile terminal 100 as the mobile terminal 100 sends the demand through the communication network 130 and the mobile communication system 110. The mobile terminal 100, which has received the web page, selects one of the list displayed on the web page, or writes a text including some letters and figures so as to send to the management server 150.

The BSM data is generated based on at least one of a BSM statistic data and a call detail records (CDRs) in the management server 150. The BSM statistic data is created by the management server 150, and the CDRs are created by the MSC of the mobile communication system 110 for every call that the MSC handles. FIG. 23 illustrates an example of the BSM statistic data according to this invention. FIG. 24 illustrates an example of the CDR according to this invention. Referring to FIG. 24, the CDRs may contain detailed statistics about calls that have been made by a subscriber such as the time each call was placed, the duration of each call, and the destination of each call. One data line 2400 of the CDRs is generated after finishing the telephone call. The CRDs are separated as different types of CDRs, and are sorted by MSCs. The CDRs sorted by a MSC are also sorted by a BSC and a BTS. The CDRs sorted by the BTS are sorted by a call final code, CFC (see a field 27 of FIG. 24).

The MSC access data grants differentially access authority to a mobile terminal for controlling the MSC based on authority and rank of the mobile terminal. And the mobile terminal is restricted within the authority to access the MSC according to the MSC access data. FIG. 25 illustrates an example of the MSC access data according to this invention. Referring to FIG. 25, the mobile terminal of Kim, Kab-Dong (011-888-xxxx) has an authority which can monitor and modify the data of an MSC 1 and an MSC 2 as the first rank. The mobile terminal of Kim, Dong-Youl (011-888-0xxx) can only monitor the data of the MSC 1 and the MSC 2 as the second rank.

FIG. 2 through FIG. 6 are a flow diagram illustrating the method for controlling data of base station in accordance with one embodiment of the present invention. And FIG. 7 through FIG. 22 are display parts of a mobile terminal for illustrating the flow diagram of FIG. 2 through FIG. 6.

Figure 2:
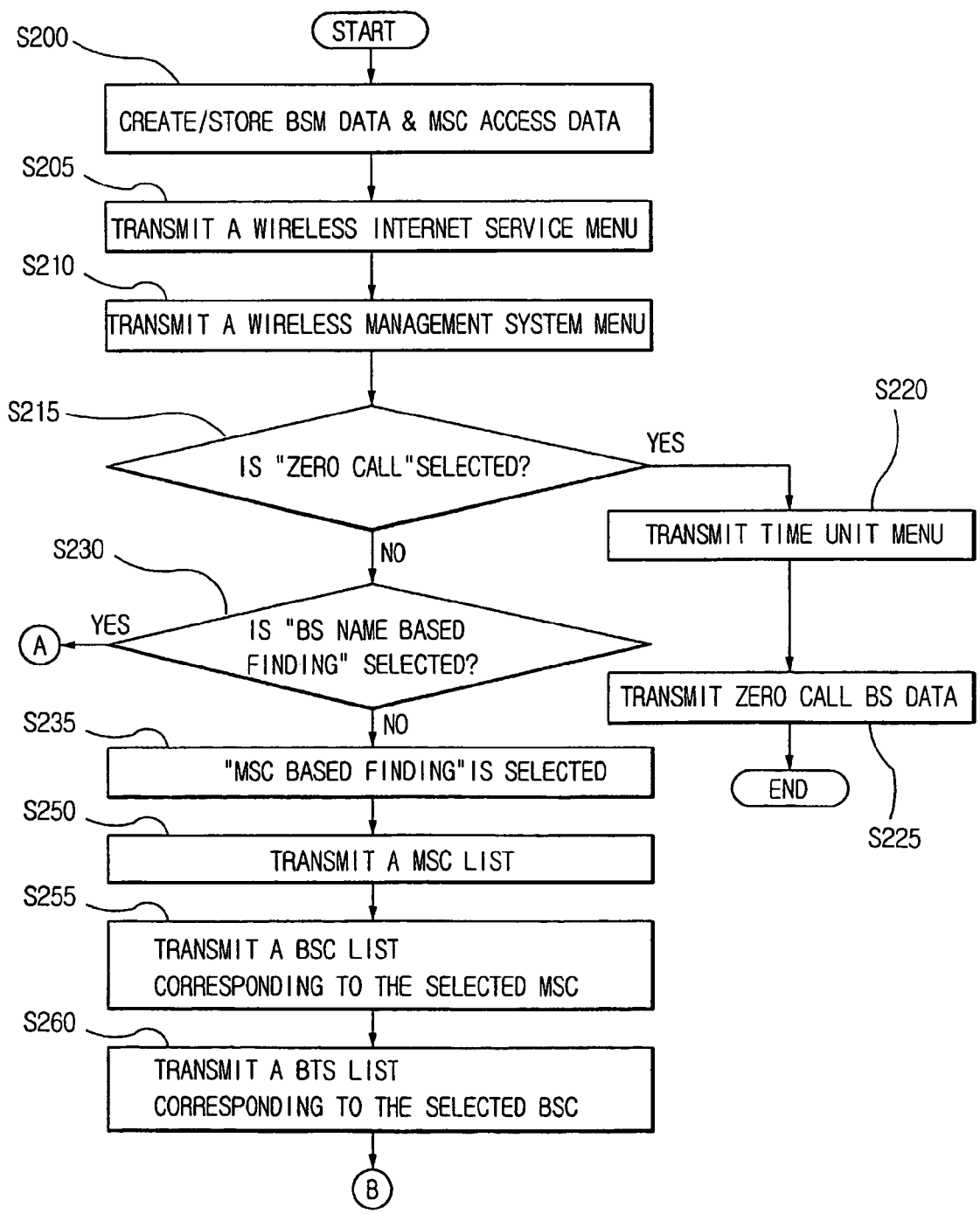
FIG. 2 through FIG. 6 are a flow diagram illustrating the method for controlling data of a base station in accordance with one embodiment of the present invention.
Figure 3:
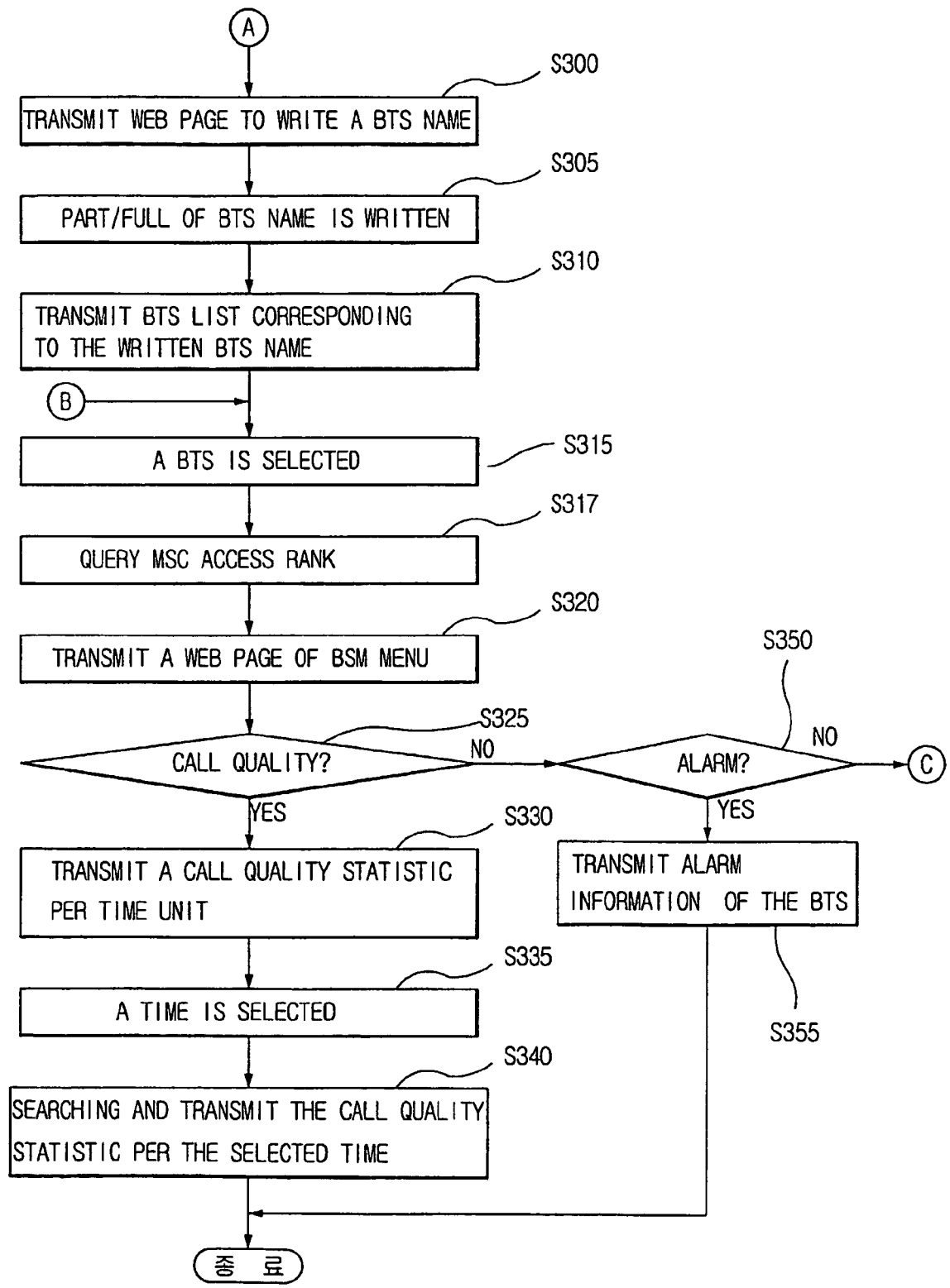

Referring to FIG. 2, the management server 150 creates the BSM data and the MSC access data and stores the BSM data and the MSC access data in the database 160 coupled to the management server 150 at a step S200.

Figure 7:
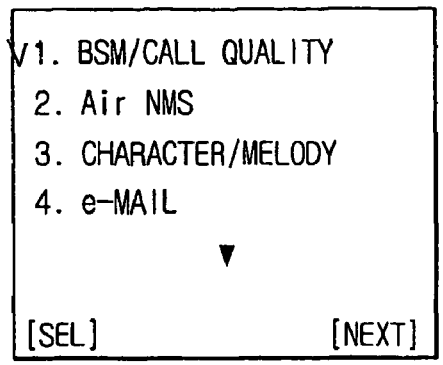

In a step S205, as the mobile terminal 100 accesses the management server 150 through the mobile communication system 110, the WAP server 120, and the communication network 130, the management server 150 transmits to the mobile terminal a web page according to whether or not the MSC access data is present in the database 160. For example, FIG. 7 illustrates the web page displayed on the mobile terminal having the MSC access authority. In the case, a wireless Internet service menu displayed on the web page further adds a "1. BSM/Call Quality Manage", managing the category.

In step S210, when the "1. BSM/Call Quality" of the wireless Internet service menu is selected by the mobile terminal 100, the management server 150 recognizes that the mobile terminal 100 requests a wireless management system menu. Thus, the management server 150 transmits the wireless management system menu to the mobile terminal 100. The wireless management system menu includes "base station based finding" and "Zero Call". Also, the "base station based finding" includes "BS name based finding" and "MSC based finding".

Figure 8:
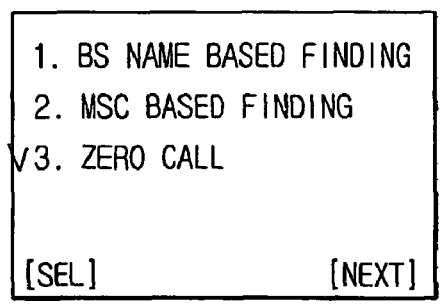

For example, as shown in FIG. 8, the list "BS name based finding", "MSC based finding", and "Zero Call" are displayed on the mobile terminal 100. When the "BS name based finding" or the "MSC based finding" is selected by the user of the mobile terminal 100, the mobile terminal 100 can receive the BS list from the management server.

In step S215, the management server 150 determines whether "Zero Call" is selected from the wireless management system menu by the mobile terminal 100. When "Zero Call" is selected in the decision step S215, the management server 150 provides a time unit menu to the mobile terminal at a step S220. The time menu includes 10 minutes, 30 minutes, 1 hours, etc.

When the mobile terminal's user selects one of the time menu, the WAP server 120 requests a zero call BS data per the selected time to the management server 150 connected to the communication network. The management server 150 searches and transmits the zero call BS data from the database 160 coupled to the management server 150 to the mobile terminal 100 at a step S225.

Figure 9:
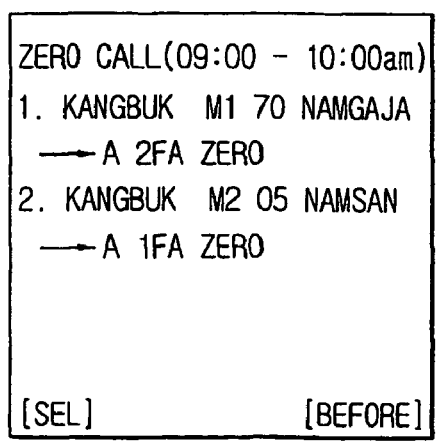

One example of the zero call BS data is shown in FIG. 9. The zero call BS data is generated by detecting that the call of reverse direction is absent in a sub cell, although no error is detected from the base station. And then the zero call BS data is stored with the time information in the database 160. The call of reverse direction in a sub cell means the call transmitted from a mobile terminal to a base station. The sub cell means a sector of a base station where a predetermined frequency is allocated.

When the "Zero Call" is not selected by the mobile terminal in the decision step S215, the management server 150 determines whether "BS name based finding" is selected by the mobile terminal at a step S230. When the "BS name based finding" is not selected, the selected item may be "MSC based finding". When the "MSC based finding" is not selected, the connection is completed between the mobile terminal 100 and the management server 150 (not shown).

At a step S250, when the mobile terminal 100 can access the MSC, the management server 150 transmits a web page including the MSC list which includes the MSC allowing access to the mobile terminal 100 based on the MSC access data stored in the database 160. Referring to FIG. 25, when the number of the mobile terminal is 011-888-XXXX, the management server 150 transmits the MSC list including M1 and M2 to the mobile terminal 100. One example of the web page including the MSC list is shown in FIG. 10.

In a step S255, the management server 150 transmits a BSC list corresponding to the M1 as M1 is selected by a key or a button of the mobile terminal 100 (Referred to FIG. 11).

In a step S260, when one of the BSC list, for example, "4. BSC 3" is selected in the display part of the mobile terminal 100 as shown in FIG. 11, the list of the BTS controlled by the BSC 3 is displayed as shown in FIG. 12. After the step S260, the procedure routine proceeds to the step S315.

When "BS name based finding" is selected in the decision step S230, the management server 150 sends a web page on which part or full name of the BST is written to the mobile terminal 100 at a step S300.

In the web page, part or full name of the BST is inputted by the mobile terminal 100 at a step S305. When the web page is sent to the management server 150, the management server 150 provides a BST list including a part or full name of the BTS to the mobile terminal 100 at a step S310. For example, when a part name of BST, i.e. a term "NAM" is written and is sent to the management server 150, the management server 150 transmits a BST list including the term "NAM" to the mobile terminal 100.

The mobile terminal 100 selects one BTS in the BTS list. In the exemplary display as shown in FIG. 12, the mobile terminal 100 selects "1. M1 05 NAMSAN" at a step S315.

The management server 150 queries an MSC access rank of the mobile terminal 100 based on the MSC access data as the mobile terminal 150 selects a BST at a step S317. Thus, in a step S320, the management server 150 transmits a BSM menu to the mobile terminal 100. The BSM menu depends on the querying result of the step S317. FIG. 25 illustrates an exemplary display of showing the MSC access data as explained above. The MSC access data includes the first rank which can monitor and change the BS data, and the second rank which only can monitor the BS data. FIG. 14 illustrates an exemplary BSM menu transmitted to the mobile terminal 100 when the MSC access rank of the mobile terminal 100 is the first. The BSM menu includes "1. Call Quality", "2. Alarm", "3. Block/Unblock", "4. Parameter", and "5. Repeater data". Additionally, when the MSC access of a mobile terminal is the second rank, the BSM menu transmitted to the mobile terminal includes only "Call Quality" and "Alarm". However, menu terms for monitoring and modifying can be often changed by a manager.

At a step S325, the management server 150 discriminates whether or not "Call Quality" is selected by the mobile terminal 100 in the web page of the BSM menu provided from the step S320.

When the "Call Quality" is selected in the decision step S325, the management server 150 transmits a call quality statistic menu based on time unit to the mobile terminal 100 through the mobile communication system 110 at a step S330.

When the mobile terminal 100 selects a wanted time unit in the call quality statistic menu based on time, the management server 150 searches the call quality data according to the wanted time from the database 160 and transmits the call quality statistic data to the mobile terminal 100 at S330 and S340. For example, when "2. Statistic for 1 hour" is selected in the web page displayed in the mobile terminal 100 as shown in FIG. 15, the management server 150 transmits the web page shown in FIG. 16 to the mobile terminal 100. FIG. 16 shows an exemplary web page which illustrates a statistic data generated during 1 hour from 7 PM to 8 PM dated on November 30 at the NAMSAN BS. Referring to FIG. 16, the call quality statistic data based on time includes a total data 161, a sector data 163, and a FA (Frequency Allocation) data 165 for a predetermined period. The total data 161, the sector data 163, and the FA data 165 include each call traffic statistic, call cut statistic, and total number of call try, respectively.

When the "Call Quality" is not selected in the decision step S325, the management server 150 discriminates whether "Alarm" is selected by the mobile terminal 100 at a step S350.

When the "Alarm" is selected in the decision step S350, the management server 150 searches alarm information of the BS as shown in FIG. 17 and transmits the alarm information to the mobile terminal 100. The Alarm information is the data that displays errors of the base station.

Figure 4:
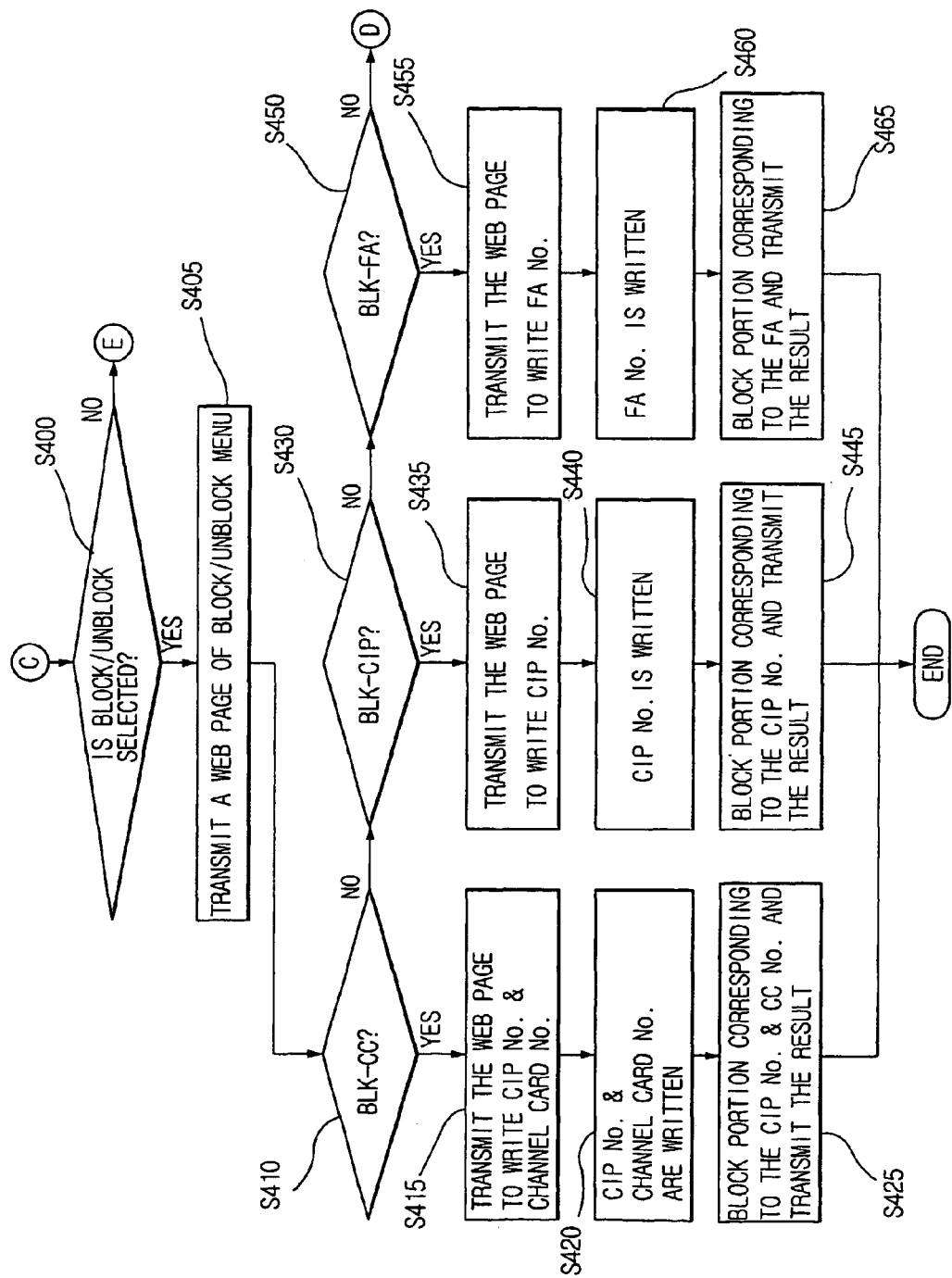

Referring to FIG. 4, when "Alarm" is not selected by the mobile terminal 100 in the step S350, the management server 150 discriminates whether "Block/Unblock" is selected by the mobile terminal 100 at a step S400. If not, a step S600 proceeds.

When the "Block/Unblock" is selected by the mobile terminal 100 in the decision step S400, the management server 150 sends a web page including a Block/Unblock list to the mobile terminal 100 at a step S405. The Block/Unblock list has a channel card block/unblock (1. BLK-CC/2. UNBLK-CC), a common interface process block/unblock (3. BLK-CIP/4. UNBLK-CIP), and a frequency allocation block/unblock (5. BLK-FA/4. UNBLK-FA) as shown in FIG. 18.

Figures 26A, 26B:
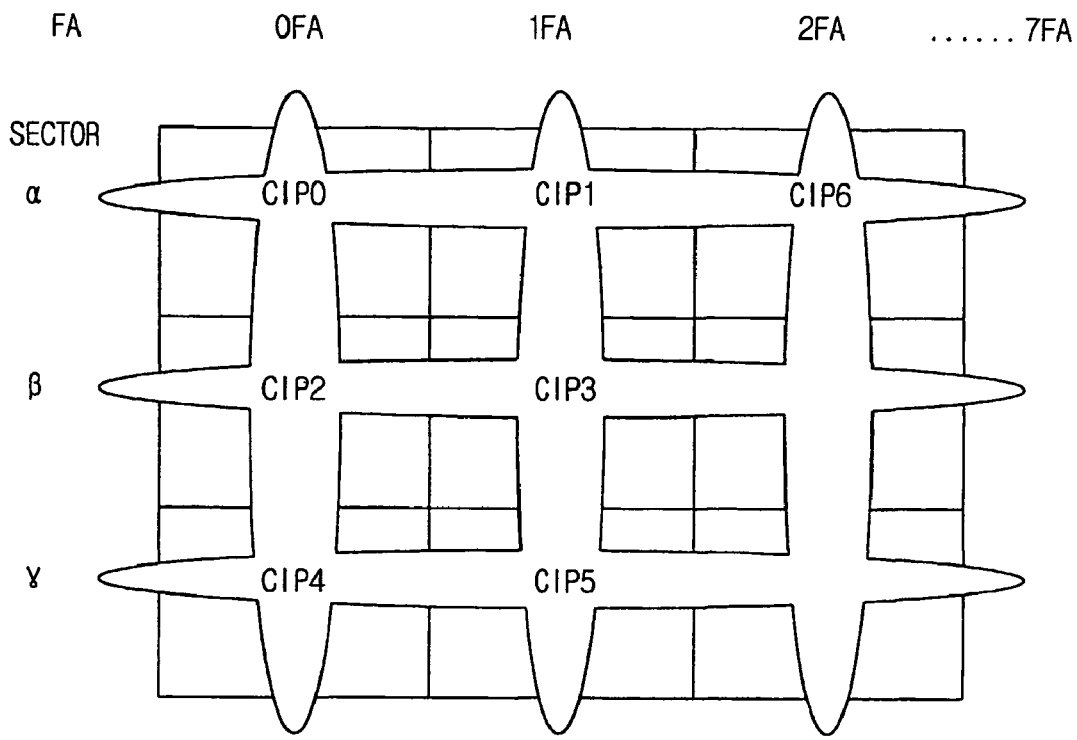
FIG. 26 illustrates block or unblock of a channel card, a common interface process, and a frequency allocation in accordance with one embodiment of the present invention.

FIG. 26a and FIG. 26b illustrate how something is blocked or unblocked. Referring to FIG. 26a, sectors α, β, and γ divide a coverage of a base station in 3 sectors. Additionally, the base station has an individual antenna for the 3 sectors. Each sectors are allocated 8 frequencies, but the number of the frequency can be changed. A Common Interface Process (CIP) defines a cross point of each sector and each numeral of frequency. The CIP includes a plurality of Channel Cards (CC).

The management server 150 discriminates whether a channel card block (1. BLK-CC) among the Block/Unblock list is selected at a step S410. When the channel card block (1. BLK-CC) is selected in the decision step S410, the management server 150 transmits a web page which can write an information corresponding to the channel card block, i.e., a CIP number and a CC number which a user of the mobile terminal wants to block at a step S415.

Th CIP number and the CC number are written by the mobile terminal 100 on the web page, as the management server 150 requests the CIP number and the CC number to the mobile terminal 100 at a step S420. The management server 150 blocks the parts corresponding to the CIP No. and the CC No., and transmits the process result to the mobile terminal 100 at a step S425.

Referring to FIG. 19, to block the channel card 2, i.e. "CC 2", the mobile terminal 100 writes "2" for "1. CIP No.: ", and also "2" for "2. CC No.:". When the management server 150 receives the CIP No. and the CC No., the channel card 2 is blocked as shown in FIG. 26. In CIP 2, the channel card 0, 2, and 3 are each blocked as shown in FIG. 26.

When the "BLK-CC" is not selected in the decision step S410, the management server 150 determines whether a "BLK-CIP" is selected by the mobile terminal 100 at a step S430.

When the "BLK-CIP" is selected in the step S430, the management server 150 transmits a web page to write the CIP No. which a user of the mobile terminal 100 wants to block at a step S435.

The mobile terminal 100 writes the CIP number for blocking the CIP in the web page and sends the web page to the management server 150 as a demand of the management server 150 at a step S440. The management server 150 blocks a part corresponding to the CIP number and sends the result of the blocking to the mobile terminal 100 at a step S445. Referring to FIG. 20, to block the channel card 2, i.e. "CC 2", the mobile terminal 100 writes "2" for "1. CIP No.:". When the management server 150 receives the CIP number, the part corresponding to the CIP number is blocked.

When the "BLK-CIP" is not selected in the step S430, the management server 150 discriminates whether a frequency allocation block (BLK-FA) is selected at a step S450. Moreover, when the "BLK-FA" is not selected in the step S450, a step S500 of FIG. 5 proceeds.

As the "BLK-FA" is selected, however, the management server 150 sends a web page to demand the frequency allocation number to the mobile terminal 100 as shown FIG. 21 at a step S455. The mobile terminal 100 writes the FA No. to block and then sends the web page to the management server 150 at a step S460. The management server 150 which receives the FA No. blocks part corresponding to the FA No. and sends the result of the blocking to the mobile terminal 100 at a step S465. Referring to FIG. 26a again, when the frequency allocation 1, i.e. "FA 1" is blocked, the CIP 1, CIP 3, and CIP 5 are all blocked.

Figure 5:
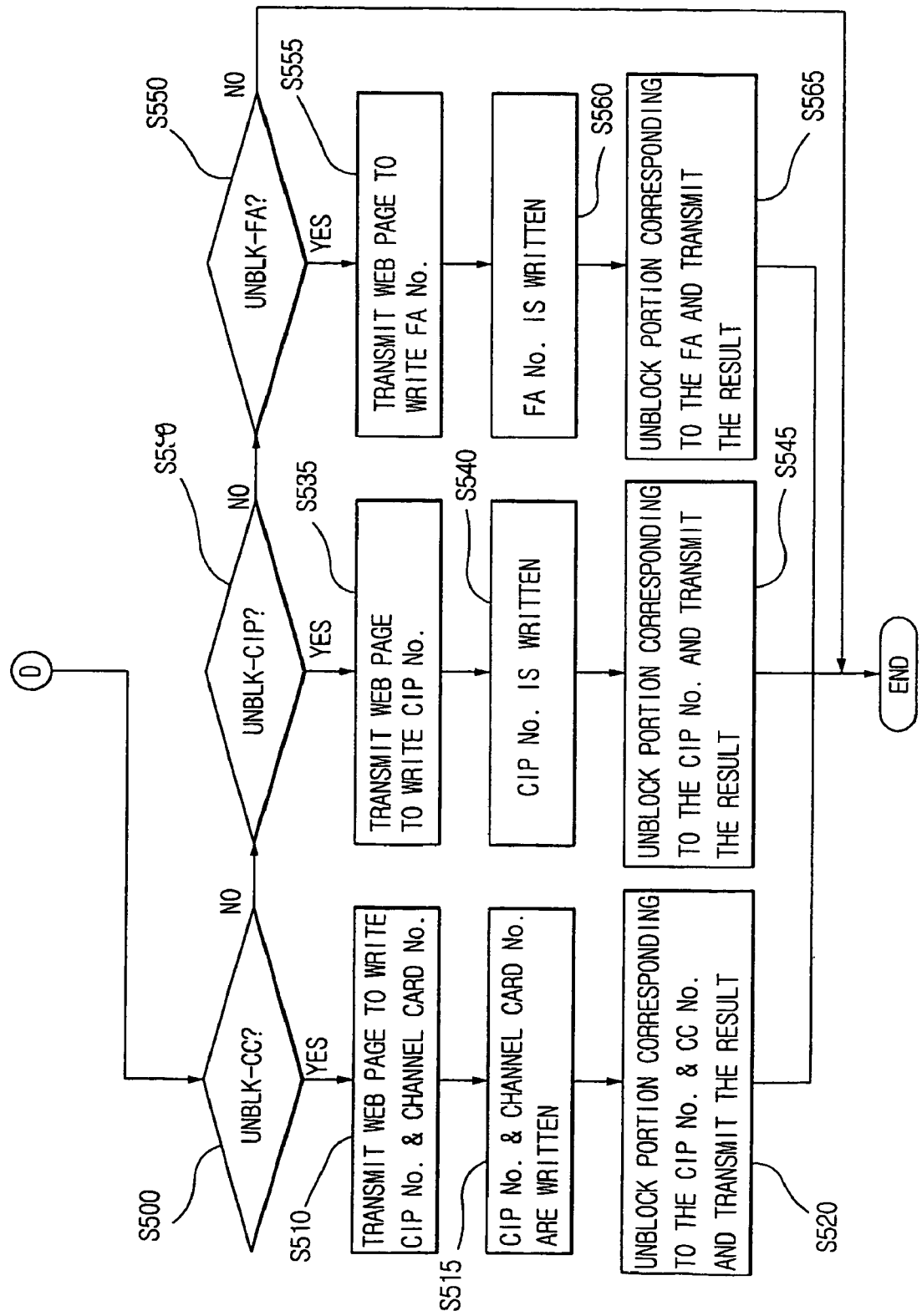

Referring to FIG. 5, when the "BLK-FA" is not selected in the step 450, the management server 150 discriminates whether a channel card unblock (UNBLK-CC) in "BLK/UNBLK" list is selected at a step S500. A method for unblocking the channel card, the common interface process, and the frequency allocation is described as follows.

When the channel card unblock (1. UNBLK-CC) is selected in the step S500, the management server 150 transmits a web page which can write an information corresponding to the channel card unblock, i.e., a CIP number and a CC number which a user of the mobile terminal wants to unblock at a step S510.

Th CIP number and the CC number are written by the mobile terminal 100 on the web page, as the management server 150 requests the CIP number and the CC number to the mobile terminal 100 at a step S515.

The management server 150 unblocks the parts corresponding to the CIP No. and the CC No., and transmits the unblocking result to the mobile terminal 100 at a step S520.

When the "UNBLK-CC" is not selected in the step S500, the management server 150 determines whether a "UNBLK-CIP" is selected by the mobile terminal 100 at a step S530.

When the "UNBLK-CIP" is selected in the step S530, the management server 150 transmits a web page to write the CIP No., the CIP of which a user of the mobile terminal 100 wants to unblock at a step S535. The mobile terminal 100 writes the CIP No. for unblocking the CIP on the web page and sends the web page to the management server 150 as a demand of the management server 150 at a step S540. The management server 150 unblocks a part corresponding to the CIP No. and sends the result of the unblocking to the mobile terminal 100 at a step S545.

When the "UNBLK-CIP" is not selected in the step S530, the management server 150 discriminates whether a frequency allocation unblock (UNBLK-FA) in the "BLK/UNBLK" list is selected at a step S550.

Moreover, when the "UNBLK-FA" is not selected in the step S550, the flow is completed. As the "UNBLK-FA" is selected, however, the management server 150 sends a web page to demand the frequency allocation number to the mobile terminal 100 at a step S555. The mobile terminal 100 writes the FA No. to unblock and then sends the web page to the management server 150 at a step S560.

The management server 150 which receives the FA No. unblocks the part corresponding to the FA No. and sends the result of the unblocking to the mobile terminal 100 at a step S565.

Figure 6:
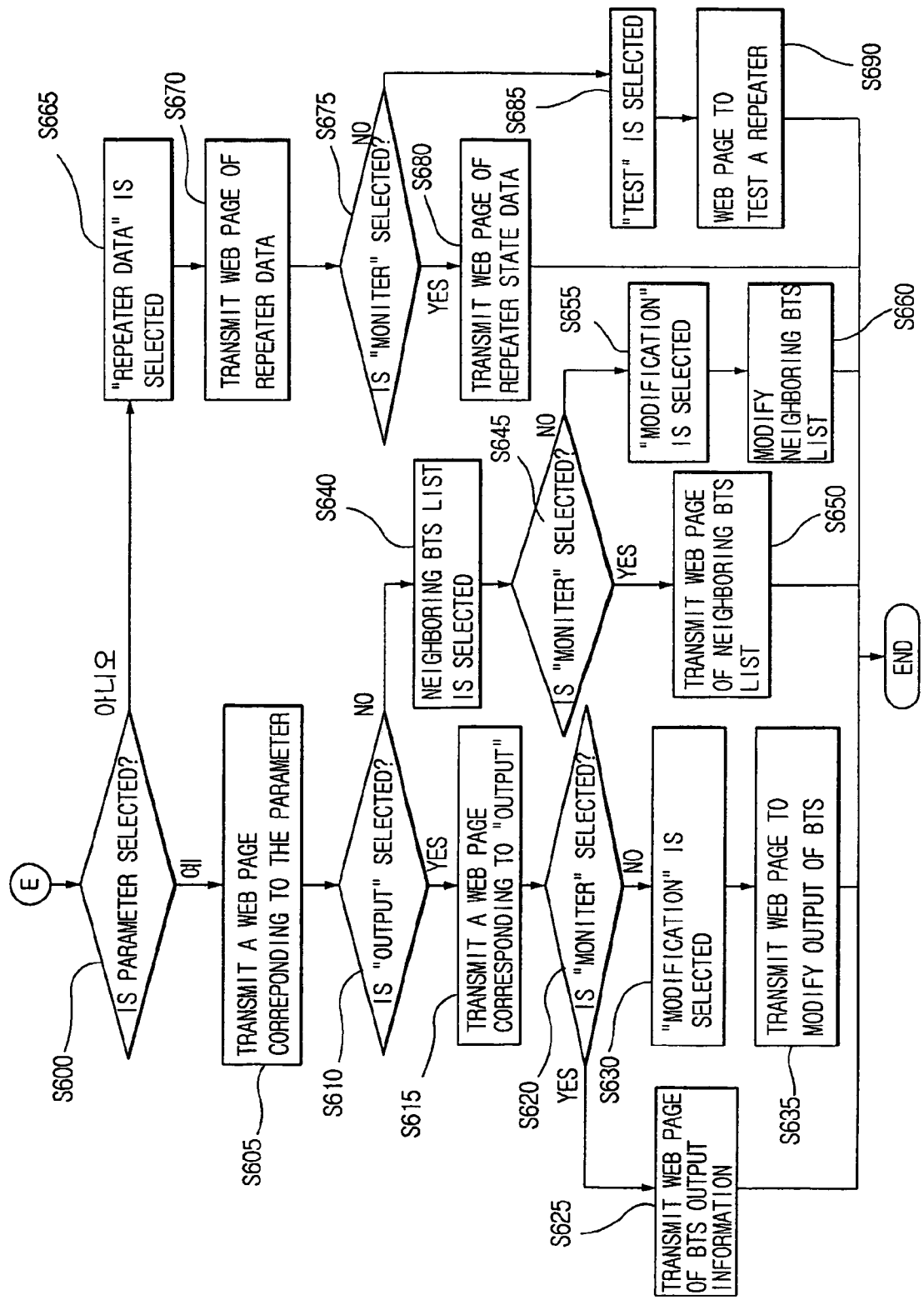

Referring to FIG. 4 and FIG. 6, when the "BLK/UNBLK" is not selected in the step S400, the "PARAMETER" in the BSM menu of the step S320 is selected by the mobile terminal 100 at a step S600.

When the "PARAMETER" is selected in the step S600, the management server 150 transmits the web page corresponding to the "PARAMETER" to the mobile terminal 100 at a step S605. The web page displays a sub-list of the "PARAMETER". The sub-list includes an "OUTPUT" of the base station, and includes a neighboring BTS list.

When the "OUTPUT" in the sub-list is selected by the mobile terminal 100, the management server 150 acknowledges to demand an output information of the BTS, and transmits the web page to display the output menu of the BTS at steps S610 and S615. The output menu of the BTS includes a "MONITOR" and a "MODIFICATION".

As the "MONITOR" is selected by the mobile terminal 100, the management server 150 transmits the web page including the output information of the BTS as shown in FIG. 22 at steps S620 and S625. The output information of the BTS is displayed according to α, β, and γ sectors.

When the "MONITOR" is not selected in the step S620, the "MODIFICATION" is selected by the mobile terminal 100 at a step S630. But if "MODIFICATOIN" is not selected, the flow is completed (Not shown).

When the "MODIFICATOIN" is selected by the mobile terminal 100, the management server 150 transmits a web page (not shown) to the mobile terminal 100, and the web page regarding the output value of the base station may be changed.

When the "NEIGHBORING BTS LIST" in the parameter menu is selected by the mobile terminal 100 in the steps S610 and S640, the management server 150 transmits the web page including the "MONITOR" and the "MODIFICATION" at a step S640. The web page is the same web page which was sent at the step S615.

When the "MONITOR" is selected by the mobile terminal 100, the management server 150 transmits the web page with the "NEIGHBORING BTS LIST" at steps S645 and S650. The "NEIGHBORING BTS LIST" is displayed on the display part of the mobile terminal 100. However, when the "MODIFICATION" is selected by the mobile terminal 100, the management server 150 transmits the web page on which the list of the neighboring BTS can be changed (Not shown) at steps S655 and S660.

If the "PARAMETER" is not selected in the step S600, the "REPEATER DATA" is selected by the mobile terminal 100 in the BSM list at a step S665.

When the "REPEATER DATA" is selected by the mobile terminal 100, the management server 150 transmits a web page including the repeater data to the mobile terminal 100 at a step S670. The repeater data includes a "MONITOR OF A REPEATER STATE" and a "REPEATER TEST".

When the "MONITOR OF A REPEATER STATE" is selected by the mobile terminal 100, the management server 150 transmits a web page having authority for monitoring to the mobile terminal 100 at steps S675 and S680. However, if the "REPEATER TEST" is selected, the management server 150 transmits a web page for testing the repeater at steps S685 and S690.

Therefore, this invention is provided to prevent the unnecessary movement to the base station or the management server which manages the MSC so as to improve efficiency and convenience for monitoring and modifying the data of the base station such as the call quality, the alarm, the block/unblock, the parameter, or the repeater data. Furthermore, this invention can maintain a special information to be requested to be secured from leaking by providing a different menu according to the user's access authority rank. Therefore, this invention is provided to enhance the security of the mobile communication system.

While the invention is susceptible to various modifications and alternative forms, specific embodiments thereof have been shown by way of example in the drawings and are herein description in detail. It should be understood, however, that the description herein of specific embodiments is not intended to limit the invention to the particular forms disclosed, but on the contrary, the invention is to include all modifications, equivalents and alternatives falling within the spirit and scope of the invention as defined by the appended claims.

What is claimed is:

1. A method for controlling data of a data base station, the method comprising the steps of:
   (a) generating and storing a base station management (BSM) data and a mobile switching center (MSC) access data at a management server;
   (b) receiving a demand to transmit the predetermined base station management (BSM) data from a mobile terminal which accesses the management server through a communication network; and
   (c) transmitting the predetermined base station management (BSM) data in response to the demand to the mobile terminal,
   wherein the step (b) comprises:
   (b-1) transmitting a wireless Internet service menu to the mobile terminal;
   (b-2) transmitting a wireless management system menu to the mobile terminal in response to a request of the wireless management system menu when the request is generated from the mobile terminal, wherein the wireless management system menu is included in the wireless Internet service menu, and the wireless management system menu includes a "zero call" and a "base station based finding";
   (b-3) transmitting a base station (BS) list including at least one base station to the mobile terminal when the "base station based finding" is selected, the base station (BS) list corresponding to the "base station based finding";
   (b-4) searching the mobile switching center (MSC) access data for a mobile switching center (MSC) access grade of the mobile terminal and transmitting a base station management (BSM) menu corresponding to the mobile switching center (MSC) access grade, when one of the base station (BS) list is selected by the mobile terminal; and
   (b-5) receiving one of the base station management (BSM) menu corresponding to the selection of the mobile terminal;
   wherein the step (c) comprises the step of searching the base station management (BSM) data in response to one of the base station management (BSM) menu and providing the base station management (BSM) data to the mobile terminal.

2. The method as claimed in claim 1, wherein the base station management (BSM) menu according to the mobile switching center (MSC) access rank includes a "monitor" and a "modification".

3. The method as claimed in claim 1, wherein the step (b) comprises the steps of:
   (b-6) transmitting a time unit menu including at least one time unit when the "zero call" is selected by the mobile terminal; and
   (b-7) receiving one of the time unit selected by the mobile terminal,
   wherein the step (c) comprises the step of searching a zero call data from the base station management (BSM) data in response to the received time unit and providing the zero call data to the mobile terminal.

4. The method as claimed in claim 1, wherein the step (b-3) comprises the steps of:
   b-31) transmitting a predetermined web page for writing a base station name to the mobile terminal when a "base station name based finding" is selected by the mobile terminal, the "base station name based finding" which is included in the "base station based finding" with a "mobile switching center (MSC) based finding";
   b-32) receiving the web page on which the base station name is written by the mobile terminal; and
   b-33) transmitting a base station list to the mobile terminal corresponding to the base station name written on the web page.

5. The method as claimed in claim 4, wherein the part of the name of the base station is written on the web page at the step (b-32), and
   wherein the step (b-33) further comprises the step of providing a base station list to the mobile terminal corresponding to the written name of the base station.

6. The method as claimed in claim 4, wherein the step (b-3) comprises the steps of:
   (b-34) transmitting the mobile switching center (MSC) list based on the mobile switching center (MSC) access data to the mobile terminal when the "mobile switching center (MSC) based finding" is selected by the mobile terminal;
   (b-35) transmitting a base station controller list to the mobile terminal, the base station controller list being included in the mobile switching center (MSC) selected by the mobile terminal among the mobile switching center (MSC) list;
   (b-36) transmitting a base station list to the mobile terminal, the base station list being included in the base station controller selected by the mobile terminal among the base station controller list.

7. The method as claimed in claim 1, wherein the step (b-5) comprises the steps of:
   (b-5-11) transmitting a call quality statistic menu including the time unit menu to the mobile terminal, when the "CALL QUALITY" in the base station management (BSM) menu is selected by the mobile terminal; and
   (b-5-12) receiving one of the time unit selected by the mobile terminal;
   wherein the step (c) comprises the step of searching data of the call quality statistic according to the time unit from the base station management (BSM) data, and providing the call quality data to the mobile terminal.

8. The method as claimed in claim 7, wherein the call quality statistic menu according to the time unit includes a total data, a sector data for a predetermined time, and a frequency allocation for a predetermined time, and wherein the total data, the sector data, and the frequency allocation include each call traffic statistic, call cut statistic, and the number of call try, respectively.

9. The method as claimed in claim 1, wherein the step (c) comprises the step of searching an alarm information of a base station from the base station management (BSM) data, and transmitting the alarm information to the mobile terminal when the "ALARM" in the base station management (BSM) menu is selected by the mobile terminal.

10. The method as claimed in claim 1, wherein the step (b-5) comprises the step of:
    (b-5-21) providing a "BLOCK/UNBLOCK" menu to the mobile terminal when the "BLOCK/UNBLOCK" in the base station management (BSM) menu is selected by the mobile terminal, and the "BLOCK/UNBLOCK" menu includes a channel card block, a channel card unblock, a common interface process block, a common interface process unblock, a frequency allocation block, and a frequency allocation unblock;
(b-5-22) transmitting a web page to the mobile terminal, the web page for writing an information corresponding to a selected one of the "BLOCK/UNBLOCK" menu;
(b-5-23) receiving the web page including the information from the mobile terminal, and
wherein the step (c) comprises the steps of:
blocking or unblocking one of the channel card, the common interface process, and the frequency allocation according to the received information; and
transmitting the blocking or unblocking result to the mobile terminal.

11. The method as claimed in claim 10, wherein the information is a common interface process number and a channel card number of the common interface process to block or to unblock when the channel card block or unblock is selected by the mobile terminal.

12. The method as claimed in claim 10, wherein the information is a common interface process number to block or to unblock when the common interface process block or unblock is selected by the mobile terminal.

13. The method as claimed in claim 10, wherein the information is a frequency allocation number to block or to unblock when the frequency allocation block or unblock is selected by the mobile terminal.

14. The method as claimed in claim 10, wherein the step (b-5) comprises the steps of:
(b-5-31) transmitting the parameter to the mobile terminal when the "PARAMETER" in the base station management (BSM) menu is selected by the mobile terminal, the parameter including a predetermined sub-list;
(b-5-32) transmitting a web page to the mobile terminal, the web page includes a monitor or a modification term which is selected by the mobile terminal, and the web page corresponds to one of the predetermined sub-list; and
(b-5-33) determining which of the monitor and the modification term is selected by the mobile terminal, and wherein the step (c) comprises selectively transmitting the web page for monitoring and modifying to the mobile terminal.

15. The method as claimed in claim 14, the sub-list of the parameter includes at least one of a base station output and a neighboring base station list.

16. The method as claimed in claim 1, wherein the step b-5) comprises the steps of:
(b-5-41) providing the repeater data to the mobile terminal when the "REPEATER DATA" in the base station management (BSM) menu is selected by the mobile terminal, the repeater data including a monitoring state of the repeater and a repeater test; and
(b-5-42) determining which of the monitoring state of the repeater and the repeater test is selected by the mobile terminal; and
wherein the step (c) comprises the step of selectively transmitting the web page to monitor the state of the repeater and the web page to test the repeater.

17. The method as claimed in claim 1, wherein the base station management (BSM) data is generated based on base station management (BSM) statistic data or detailed call records.

18. The method as claimed in claim 1, wherein the mobile switching center (MSC) access data grants a mobile switching center (MSC) access authority to the mobile terminal, and restricts access of the mobile terminal to a mobile switching center (MSC).

19. The method as claimed in claim 1, wherein the base station management (BSM) data is generated based on base station management (BSM) statistic data or detailed call records, and the mobile switching center (MSC) access data grants a mobile switching center (MSC) access authority to the mobile terminal, and restricts access of the mobile terminal to a mobile switching center (MSC).

* * * * *

UNITED STATES PATENT AND TRADEMARK OFFICE
CERTIFICATE OF CORRECTION

| | |
|---|---|
| PATENT NO. | : 7,457,618 B2 |
| APPLICATION NO. | : 10/496988 |
| DATED | : November 25, 2008 |
| INVENTOR(S) | : Myong-Soo Kang et al. |

Page 1 of 1

It is certified that error appears in the above-identified patent and that said Letters Patent is hereby corrected as shown below:

Title Page, Item (75) Inventors: should read

(75) Inventors: Myong-Soo KANG, Gwangmyeong-si (KR); Seung-Han KIM, Seoul (KR); Yun-Je SUNG, Suwon-si (KR); Won-Cheol HAN, Goyang-si (KR); Geon-Jung KIM, Seoul (KR)

Signed and Sealed this

Third Day of March, 2009

JOHN DOLL
*Acting Director of the United States Patent and Trademark Office*